No. 874,111. PATENTED DEC. 17, 1907.
C. C. PARSONS.
MILKING MACHINE.
APPLICATION FILED APR. 22, 1907.
2 SHEETS—SHEET 1.
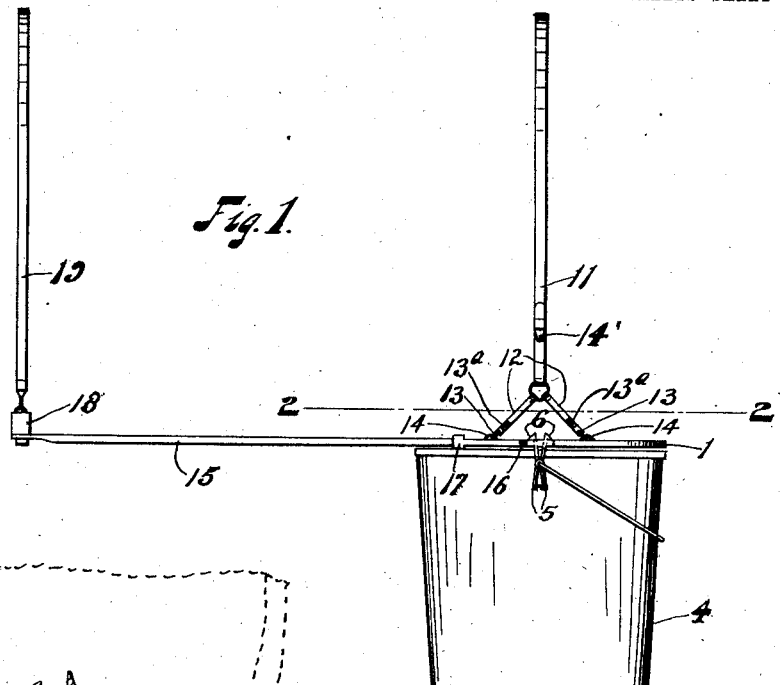
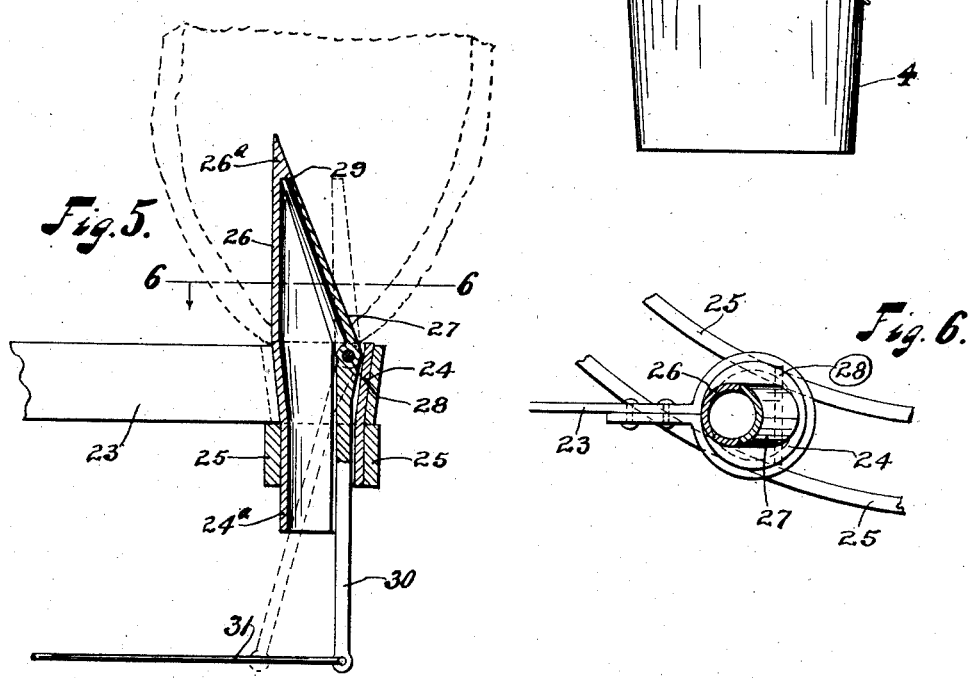
Witnesses:
Edw. Lindmueller.
Ira E. Stump
Inventor:
Clarence C. Parsons
By Fred C. Billman His Attorney.

No. 874,111. PATENTED DEC. 17, 1907.
C. C. PARSONS.
MILKING MACHINE.
APPLICATION FILED APR. 22, 1907.
2 SHEETS—SHEET 2.
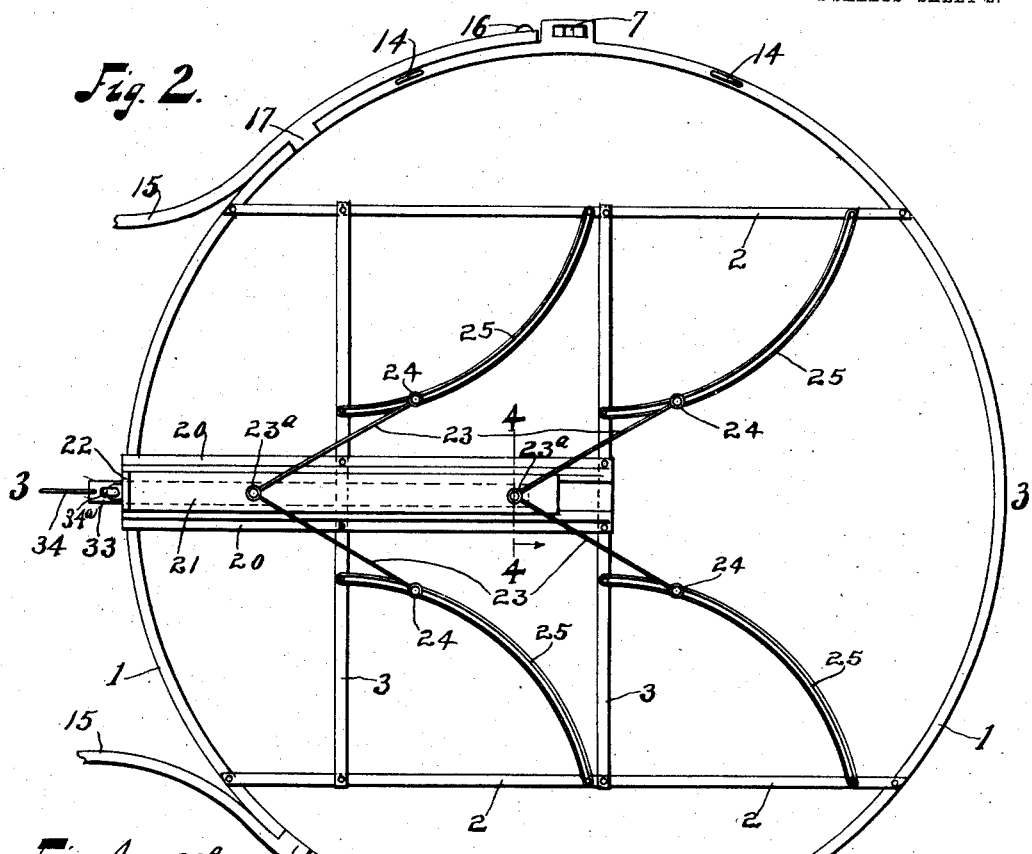
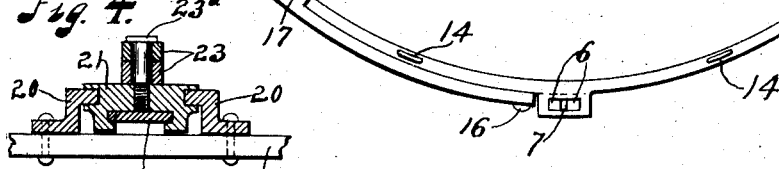
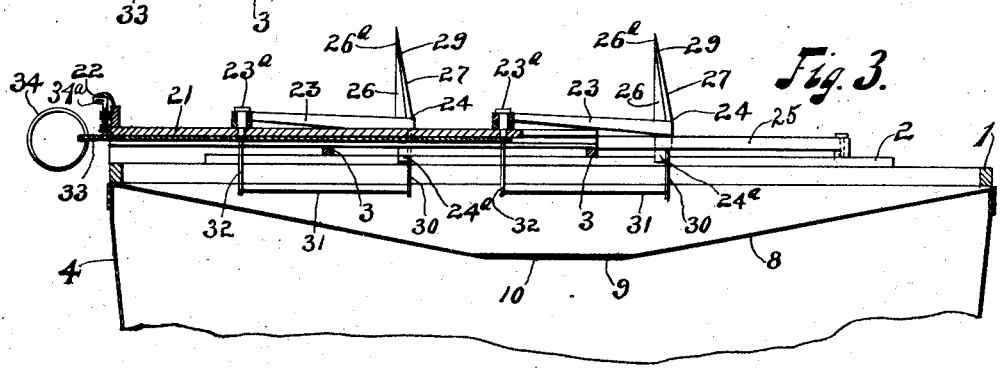

UNITED STATES PATENT OFFICE.

CLARENCE C. PARSONS, OF OBERLIN, OHIO.

MILKING-MACHINE.

No. 874,111.  Specification of Letters Patent.  Patented Dec. 17, 1907.

Application filed April 22, 1907. Serial No. 369,503.

*To all whom it may concern:*

Be it known that I, CLARENCE C. PARSONS, a citizen of the United States, residing at Oberlin, in the county of Lorain and State of Ohio, have invented certain new and useful Improvements in Milking-Machines, of which the following is a specification.

My invention relates to improvements in milking-machines, and the primary object of the invention is to produce a generally-improved device of this class which will be exceedingly simple in construction, cheap of manufacture, efficient in use, and much better adapted to its intended purposes than any other device of the same class with which I am acquainted.

The invention relates more particularly to a teat-opener or dilator, adapted to be inserted in the teat-opening or duct, and means for positioning and simultaneously manipulating the same with reference to the several teats of the udder or bag of the cow.

When the teat-opening or duct has been dilated by means of the dilator to form an artificial opening the milk flows freely and automatically from the opening thus formed in a much more expeditious and natural manner than by the use of the ordinary vacuum or pneumatic milking-machine.

Another object is to provide a device of this class which may be readily attached to or detached from the cow and permit of any desired adjustment, as well as provide means for quickly attaching and detaching the milk-pail and carrying the same in proper position.

A further object is to provide a device which can be readily kept clean as well as keeping the milk clean during the milking operation.

With these and other ends in view, the invention consists in the novel construction, arrangement and combination of parts, hereinafter described, illustrated in the accompanying drawings, and particularly pointed out in the appended claims.

Referring to the drawings, forming a part of this specification, Figure 1, is a side elevation of the improved device, illustrating the manner of securing the same to the body of a cow, and manner of-securing the milk-pail to the supporting-frame. Fig. 2, an enlarged top plan view as indicated by 2,—2, of Fig. 1. Fig. 3, a sectional view taken through line 3,—3, of Fig. 2. Fig. 4, a sectional view taken through line 4—4, of Fig. 2. Fig. 5, an exaggerated detail sectional view of the teat-opener or dilator and its connections. Fig. 6, a cross-sectional view of the same taken through line 6,—6, of Fig. 5.

Similar characters of reference designate like parts throughout all the figures of the drawings.

The main supporting-frame consists of a main supporting-ring or band 1, carrying longitudinal or side-bars 2, connected by cross-bars 3, all connected and secured to each other in any suitable and convenient manner.

The supporting-ring or band 1, of the supporting-frame is adapted to carry a milk-pail 4, beneath, the latter being attached thereto, in the present instance, by means of spring-resisted latch-arms 5, on each side of the pail, and, preferably, mounted on the intake or engaging ends of the pail-handle. The upper ends of the latch-bars 5, are provided with hooks 6, adapted to be inserted in openings 7, on each side of the supporting-ring 1, and to snap into engagement with said ring when passed through said openings as shown most clearly in Fig. 1, of the drawings. The top of the pail 4, is preferably provided with a cover 8, provided with a central opening 9, and strainer 10.

The supporting-frame is suspended in proper position by means of a main supporting-strap 11, adapted to pass directly upwardly over the body of the cow, said strap 11, carrying in its depending-ends branch-straps 12, preferably provided with snap-hooks 13, taking into eyes 14, of the supporting-ring 1. The straps 12, are preferably provided with buckles 13ª, by means of which the horizontal position or inclination of the supporting-frame may be adjusted as desired, and the main supporting-strap 11, is preferably provided with a buckle 14', by means of which the vertical position of the frame may be adjusted vertically as desired.

The supporting-frame may be supported horizontally by means of horizontal side-bars 15, secured at their rear ends to the sides of the supporting-ring 1, by means of bolts 16, and lugs 17, said side-bars 15, being adapted to extend forwardly beneath the belly of the cow and be secured at their front ends to a bow or yoke 18, carried by means of a second or auxiliary supporting-strap 19, adapted to pass over the body of the cow in a similar manner to the main supporting-strap 11.

A pair of longitudinal flange or guide-bars 20, are mounted above the cross-bars 3, and the front or forward side of the supporting-ring 1, and carry a slidably-mounted operating-bar 21, provided at its front with a handle 22. Adjusting-arms 23, are arranged in pairs and are pivotally-secured at their front or inner ends above the operating-bar 21, by means of pivot-pins 23$^a$, and said arms 23, extend rearwardly and outwardly and carry at their outer or rear ends teat-cups 24, having a depending shank portion 24$^a$, slidably-mounted in outwardly and rearwardly-extending curved guide-members 25, secured at their inner and outer ends to the cross-bars 3, and side-bars 2, respectively, in any suitable and convenient manner.

The teat-opener or dilator comprises an upwardly-extending dilator-shank 26, preferably formed integral with the teat-cup 24, as shown, and a movable dilator member 27, pivotally-mounted in the teat-cup, opposite said dilator-shank 26, by means of a pivot-pin 28. The dilator-shank 26, and movable member 27, are of concavo-convex shape, in cross-section, and when in their normal position, as shown in Figs. 3, and 5, form an upwardly-tapering tubular teat-opener or dilator, the shank 26, being pointed at its upper extremity 26$^a$, and provided with an off-set notch or recess 29, forming a seat or pocket for the reception of the upper end of the movable member 27, and of a depth corresponding with the thickness thereof, so that the member 27, will normally rest flush with the sides of the shank 26.

The several teat-cups carrying the several teat-openers or dilators are adapted to be moved or positioned simultaneously to correspond with the relative position of the teats by means of the handle 22, of the slidably-mounted operating-bar 21, carrying the adjusting-arms 23, and when the parts have been properly positioned, the bar 21, if necessary or desirable may be locked or latched with any suitable device and the teat-openers or dilators inserted in the openings or ducts of the teats.

As a means for simultaneously moving the movable dilator-members 27, to open or dilate the respective teats to form an artificial opening or duct to permit a free flow of milk, the members 27, are provided with depending levers 30, provided with connecting-bars 31, connected to depending fixed arms or pins 32, secured to the under side of a second or teat-dilator operating-bar 33, slidably-mounted beneath the operating-bar 21, and provided at its front end with a handle-ring 34. Any suitable and convenient fastening device may be used, if desired, to secure the bar 33, in any position to which it may be adjusted, but, preferably, by means of a vertically-arranged latch-bolt 34$^a$.

When the movable dilator members 27, have been moved to the position indicated by dotted lines of Fig. 5, an artificial opening or duct is formed and the milk will flow freely therethrough and will be conducted by the cover 8, below, through the central opening 9, and strainer 10, into the pail 4, below. By moving the teat-dilator operating-bar 33, to its initial position the movable dilator members 27, are caused to assume their normal position and the teat-openers or dilators may be readily removed.

From the foregoing description, taken in connection with the accompanying drawings, the operation and advantages of my invention will be readily understood.

Having thus described my invention, without having attempted to set forth all the forms in which it may be made, or all the modes of its use, I declare that what I claim and desire to secure by Letters Patent, is,—

1. A milking-machine, comprising a supporting-frame, a pair of longitudinal guide-bars mounted thereon and carrying a slidably-mounted operating-bar, outwardly-extending curved guide members mounted on said frame, adjusting-arms pivotally-secured to said operating-bar and carrying teat-cups slidably-mounted in said guide-members, teat-openers or dilators carried by said teat-cups, a teat-dilator operating-bar slidably-mounted beneath said first mentioned operating-bar, and connecting-bars connected to said teat-dilator operating-bar and said teat-openers or dilators.

2. A milking-machine, comprising a supporting-frame provided with guide-bars carrying a slidably-mounted operating-bar, outwardly-extending guide-members mounted on said frame, adjusting-arms secured to said operating-bar and carrying teat-cups slidably-mounted in said guide-members, and teat-openers or dilators carried by said teat-cups and provided with means for operating the same.

3. A milking-machine, comprising a frame, an operating-arm slidably-mounted on said frame, guide-members carrying slidably-mounted teat-cups, arms connecting said teat-cups to said operating-arm, teat-dilators carried by said teat-cups, and means for operating said teat-dilators.

4. A milking-machine, comprising a supporting-frame, a slidably-mounted operating-arm carried by said frame, guide members carrying slidably-mounted teat-cups, arms connecting said teat-cups to said operating-arm, teat-dilators carried by said teat-cups, and a second or dilator-operating-arm carried by said first mentioned operating-arm and connected to said teat-dilators.

5. A teat-dilator, comprising a dilator-shank, and a movable dilator member pivotally-mounted opposite said shank, said shank being pointed at its upper extremity and provided with an offset notch forming a seat or pocket for the upper end of said movable dilator member.

6. A teat-dilator, comprising a tapered dilator-shank, a teat-cup and a pivotally-mounted dilator member normally engaging said shank.

7. A teat-dilator, comprising a pointed dilator-shank and an oppositely-disposed pivotally-mounted dilator member.

8. A teat-dilator, comprising a tapered dilator-shank of concavo-convex shape in cross section, and a diametrically-opposite movable dilator member of concavo-convex shape in cross section and normally registering with said dilator-shank to form a two-part hollow tapering teat-dilator.

9. A teat-dilator, comprising a tapered dilator-shank provided with a teat-cup and a movable dilator-member pivotally-mounted in said teat-cup opposite said shank.

In testimony whereof I have affixed my signature, in presence of two witnesses.

CLARENCE C. PARSONS.

Witnesses:
WILLIS A. HART,
E. L. BURGE.